United States Patent
Gomi et al.

(10) Patent No.: US 7,119,788 B2
(45) Date of Patent: *Oct. 10, 2006

(54) IMAGE PROCESSING APPARATUS, IMAGE PROCESSING METHOD, PROVIDING MEDIUM AND PRESENTATION SYSTEM

(75) Inventors: Shinichiro Gomi, Chiba (JP); Kazuhiko Ueda, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 125 days.

(21) Appl. No.: 09/464,161

(22) Filed: Dec. 16, 1999

(65) Prior Publication Data

US 2003/0011566 A1    Jan. 16, 2003

(30) Foreign Application Priority Data

Dec. 17, 1998   (JP)   ................................ 10-358806

(51) Int. Cl.
*G09G 5/00* (2006.01)

(52) U.S. Cl. ...................................... 345/156; 345/158

(58) Field of Classification Search ................ 345/157, 345/158, 156, 180; 382/199; 348/61, 207; 353/122

See application file for complete search history.

(56) References Cited

U.S. PATENT DOCUMENTS

| | | | | |
|---|---|---|---|---|
| 4,280,135 A | * | 7/1981 | Schlossberg | ................. 358/93 |
| 5,489,923 A | * | 2/1996 | Marshall et al. | ............ 345/156 |
| 5,502,459 A | * | 3/1996 | Marshall et al. | ............ 345/158 |
| 5,515,079 A | * | 5/1996 | Hauck | ......................... 345/157 |
| 5,572,251 A | * | 11/1996 | Ogawa | .................. 348/207.99 |
| 5,742,279 A | * | 4/1998 | Yamamoto et al. | ......... 345/173 |
| 5,914,783 A | * | 6/1999 | Barrus | ....................... 356/375 |
| 6,021,221 A | * | 2/2000 | Takaha | ....................... 382/199 |
| 6,050,690 A | * | 4/2000 | Shaffer et al. | ............. 353/122 |
| 6,061,052 A | * | 5/2000 | Raviv et al. | ................ 345/180 |
| 6,275,214 B1 | * | 8/2001 | Hansen | ...................... 345/158 |
| 6,512,507 B1 | * | 1/2003 | Furihata et al. | ............ 345/157 |

FOREIGN PATENT DOCUMENTS

| | | |
|---|---|---|
| JP | 06-308879 | 11/1994 |
| JP | 08-095707 | 4/1996 |
| JP | 09-120340 | 5/1997 |
| JP | 10-039994 | 2/1998 |

* cited by examiner

*Primary Examiner*—Richard Hjerpe
*Assistant Examiner*—Kevin M. Nguyen
(74) *Attorney, Agent, or Firm*—Finnegan, Henderson, Farabow, Garrett & Dunner L.L.P.

(57) ABSTRACT

An image including a bright point which is specified in another image on a screen is captured. An image processing apparatus applies threshold processing to the pixel values of the captured image to determine the position of the bright point. The image processing apparatus calculates the logical product of a pixel value in the current frame line and that in the line one frame line before (or after) for binarization in the unit period of the blinking pattern of the bright point having a margin of one frame to detect the blinking pattern of the bright point.

6 Claims, 17 Drawing Sheets

IMAGE PROCESSING APPARATUS, IMAGE PROCESSING METHOD, PROVIDING MEDIUM AND PRESENTATION SYSTEM

BACKGROUND OF THE INVENTION

1. Field of the Invention

The present invention relates to image processing apparatuses, image processing methods, providing media, and presentation systems, and more particularly, an image processing apparatus, an image processing method, a providing medium, and a presentation system which allow a specified position on a display screen and the state of the specified position to be simultaneously recognized.

2. Description of the Related Art

Electronic presentations have been widely performed with projectors and personal computers (PCs) having presentation software. In such an electronic presentation, a part of an image projected on a screen may be specified by the use of a pointer or a laser pointer in many cases.

A speaker operates a mouse or a remote commander using electronic waves or infrared light for a PC to execute presentation software installed in the PC. Alternatively, the speaker asks another person to operate the PC. In the presentation software, a predetermined position on the screen is related to an operation of the PC in advance, and appropriate processing is performed.

Japanese Unexamined Patent Publication No. Hei-6-308879 discloses that when a speaker specifies a position on a display screen by a pointer, the pointer receives light emitted by a photoelectric conversion device installed on the display screen or in the vicinity of the screen, the axial direction of the pointer is calculated from the light, and a pointer mark is displayed in the axial direction on the screen.

Japanese Unexamined Patent Publication No. Hei-8-95707 discloses that when a speaker specifies a position on a display screen by a pointer, the shade of the pointer is captured by an infrared camera, and the tip position of the pointer is detected to obtain the specified position.

Japanese Unexamined Patent Publication No. Hei-9-120340 discloses that when a speaker specifies a position on a display screen by a laser beam, the spot diameter of the laser beam on the display screen is changed, and the specified position is detected from differences in timing when devices disposed at three corners of the screen detect the change of the spot diameter.

Japanese Unexamined Patent Publication No. Hei-10-39994 discloses that when a speaker specifies a position on a display screen, the position of the speaker, the inclination of the speaker, the position where the speaker views are detected to obtain the specified position.

In these conventional technologies, however, only the position specified by a pointing device is detected, but image information at the position cannot be obtained.

In addition, a complicated apparatus is required to detect the position and the angle of a screen and the position specified by a pointing device.

SUMMARY OF THE INVENTION

The present invention has been made in consideration of the above situations. Accordingly, it is an object of the present invention to provide an image processing apparatus, an image processing method, a providing medium, and a presentation system which allow a position pointed by a pointing device on a displayed image and image information at the position to be simultaneously detected.

Another object of the present invention is to provide a simple image processing apparatus which allows the position and the angle of a screen and a position pointed by a pointing device on a displayed image to be detected.

One of the foregoing object is achieved in one aspect of the present invention through the provision of an image processing apparatus including position determination means for determining from image information indicating a captured second image which includes a bright point disposed on a first image the position of the bright point, and blinking-pattern detection means for binarizing the image information to detect the blinking pattern of the bright point disposed on the first image.

One of the foregoing object is achieved in another aspect of the present invention through the provision of an image processing method including a position determination step of determining from image information indicating a captured second image which includes a bright point disposed on a first image the position of the bright point, and a blinking-pattern detection step of binarizing the image information to detect the blinking pattern of the bright point disposed on the first image.

One of the foregoing object is achieved in yet another aspect of the present invention through the provision of a providing medium for providing a computer-readable program which makes an image processing apparatus execute processing, the processing including a position determination step of determining from image information indicating a captured second image which includes a bright point disposed on a first image the position of the bright point, and a blinking-pattern detection step of binarizing the image information to detect the blinking pattern of the bright point disposed on the first image.

According to the image processing apparatus, the image processing method, and the providing medium of the present invention, from image information indicating a captured second image which includes a bright point disposed on a first image, the position of the bright point is determined, and the image information is binarized to detect the blinking pattern of the bright point. Therefore, both position and blinking pattern of the bright point can be detected.

One of the foregoing object is achieved in a further aspect of the present invention through the provision of an image processing apparatus for processing an image of an object having four points of which the mutual relative positions are known, including first calculation means for calculating the gradient of the object in a three-dimensional space from the positions of the four points on the image, and second calculation means for calculating the position of the object in the three-dimensional space from the gradient of the object in the three-dimensional space calculated by the first calculation means and the distances between the four points.

One of the foregoing object is achieved in a yet further aspect of the present invention through the provision of an image processing method for an image processing apparatus that processes an image of an object having four points of which the mutual relative positions are known, including a first calculation step of calculating the gradient of the object in a three-dimensional space from the positions of the four points on the image, and a second calculation step of calculating the position of the object in the three-dimensional space from the gradient of the object in the three-dimensional space calculated in the first calculation step and the distances between the four points.

One of the foregoing object is achieved in a still further aspect of the present invention through the provision of a providing medium for providing a computer-readable program which makes an image processing apparatus that processes an image of an object having four points of which the mutual relative positions are known execute processing, the processing including a first calculation step of calculating the gradient of the object in a three-dimensional space from the positions of the four points on the image, and a second calculation step of calculating the position of the object in the three-dimensional space from the gradient of the object in the three-dimensional space calculated in the first calculation step and the distances between the four points.

According to the image processing apparatus, the image processing method, and the providing medium of the present invention, the gradient of the object in the three-dimensional space is calculated from the positions of the four points on the image, and the position of the object in the three-dimensional space is calculated from the distances between the four points and the gradient of the object in the three-dimensional space. Therefore, the position and the angle of a screen and a position pointed by a pointing device on a displayed image are allowed to be detected by a simple apparatus.

One of the foregoing object is achieved in a yet still further aspect of the present invention through the provision of a presentation system including image display means for displaying a first image; pointing means for pointing a predetermined position on the first image by a bright point; pickup means for capturing a second image which includes the bright point pointed on the first image; image processing means for determining the position of the bright point on the first image from image information indicating the second image and for binarizing the image information to detect the blinking pattern of the bright point on the first image; and combination means for combining the first image correspondingly to the position of the bright point and the blinking pattern of the bright point detected by the image processing means.

According to the presentation system of the present invention, the predetermined position on the first image is specified by a bright point; the position of the bright point on the first image is determined from image information indicating the second image which includes the bright point specified on the first image; the image information is binarized to detect the blinking pattern of the bright point on the first image; and the first image is combined correspondingly to the position and the blinking pattern of the detected bright point. Therefore, the image corresponding to the position and the blinking pattern of the bright point can be instantaneously displayed.

DESCRIPTION OF THE PREFERRED EMBODIMENTS

Figure 1:
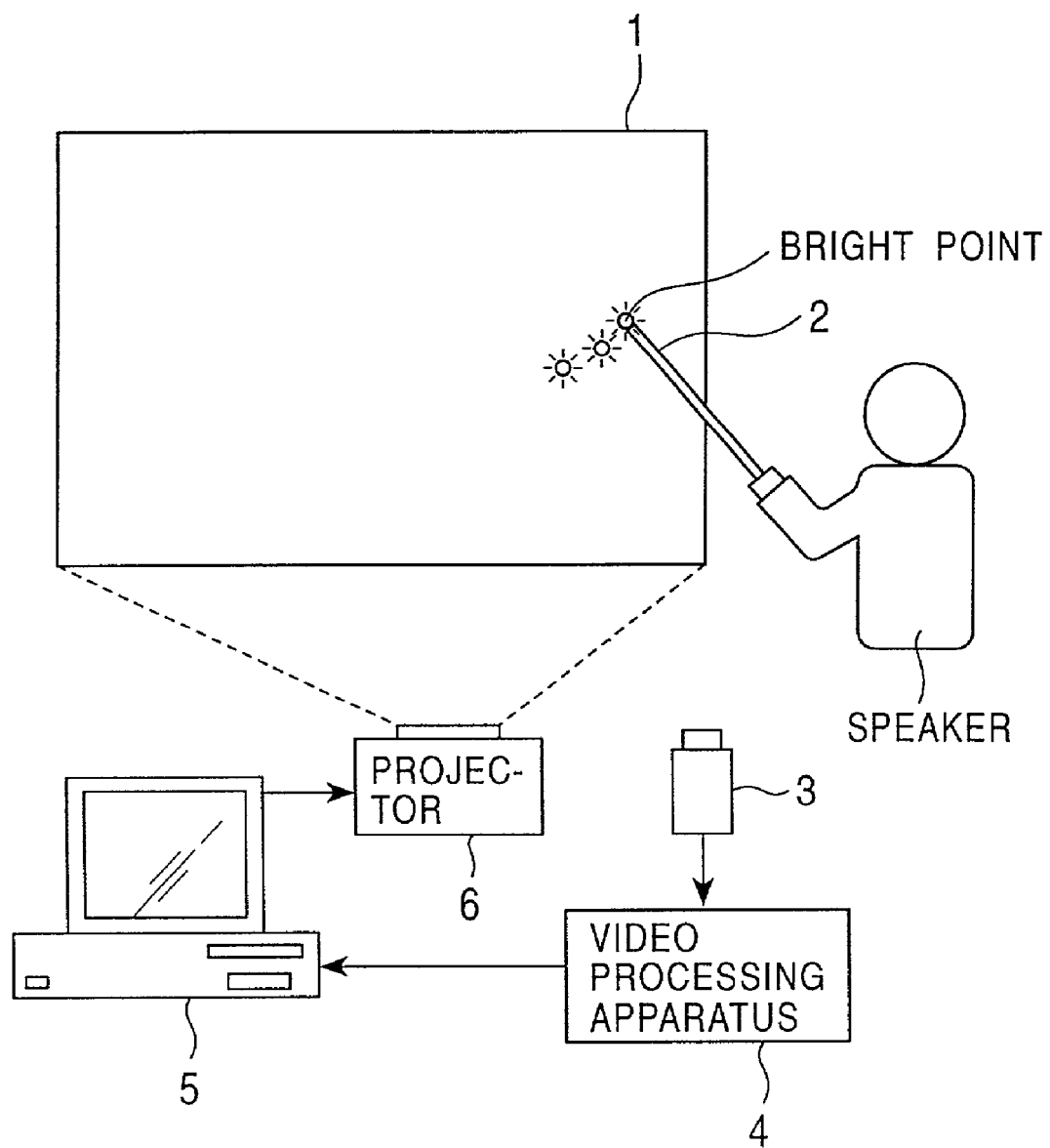
FIG. 1 is a block diagram of a presentation system according to an embodiment of the present invention.

Embodiments of the present invention will be described below. To clarify the relationship between each means specified in claims and the following embodiments, features of the present invention will be described first with an embodiment (only one example) corresponding to each means being added after the means in parentheses. The following description does not mean that each means is limited to the written example.

An image processing apparatus of the present invention includes position determination means (for example, a step S1 to a step S12 shown in FIG. 3) for determining from image information indicating a captured second image which includes a bright point disposed on a first image the position of the bright point, and blinking-pattern detection means (for example, a step S13) for binarizing the image information to detect the blinking pattern of the bright point disposed on the first image.

An image processing apparatus of the present invention includes first calculation means (for example, a step S37 shown in FIG. 6) for calculating the gradient of an object in a three-dimensional space from the positions of four points on an image, and second calculation means (for example, a step S38 shown in FIG. 6) for calculating the position of the object in the three-dimensional space from the gradient of the object in the three-dimensional space calculated by the first calculation means and the distances between the four points.

A presentation system of the present invention includes image display means (for example, a screen 1 shown in FIG. 1) for displaying a first image; pointing means (for example, a pointer 2 shown in FIG. 1) for pointing a predetermined position on the first image by a bright point; pickup means (for example, a video camera 3 shown in FIG. 1) for capturing a second image which includes the bright point pointed on the first image; image processing means (for example, an image processing apparatus 4 shown in FIG. 1) for determining the position of the bright point on the first image from image information indicating the second image and for binarizing the image information to detect the blinking pattern of the bright point on the first image; and combination means (for example, a personal computer 5 shown in FIG. 1) for combining the first image correspondingly to the position of the bright point and the blinking pattern of the bright point detected by the image processing means.

First Embodiment

A presentation system according to an embodiment of the present invention will be described below by referring to the drawings. FIG. 1 is a block diagram showing a structure of the presentation system.

In the presentation system of the present embodiment, a speaker makes a presentation while the speaker specifies a position on an image displayed on a screen 1 by a pointer 2, and a video camera 3 captures the condition. An image processing apparatus 4 detects the position of a bright point in an image captured by the video camera 3 and the blinking pattern of the bright point made while time elapses, and sends the bit pattern corresponding to the blinking pattern to a personal computer 5. The personal computer 5 receives the position of the bright point and the bit pattern indicating the blinking pattern of the bright point made while time elapses, processed by the image processing apparatus 4, and generates a combined image corresponding to the position of the bright point and the bit pattern indicating the blinking pattern of the bright point. A projector 6 projects image information sent from the personal computer 5 onto the screen 1.

Figure 2:
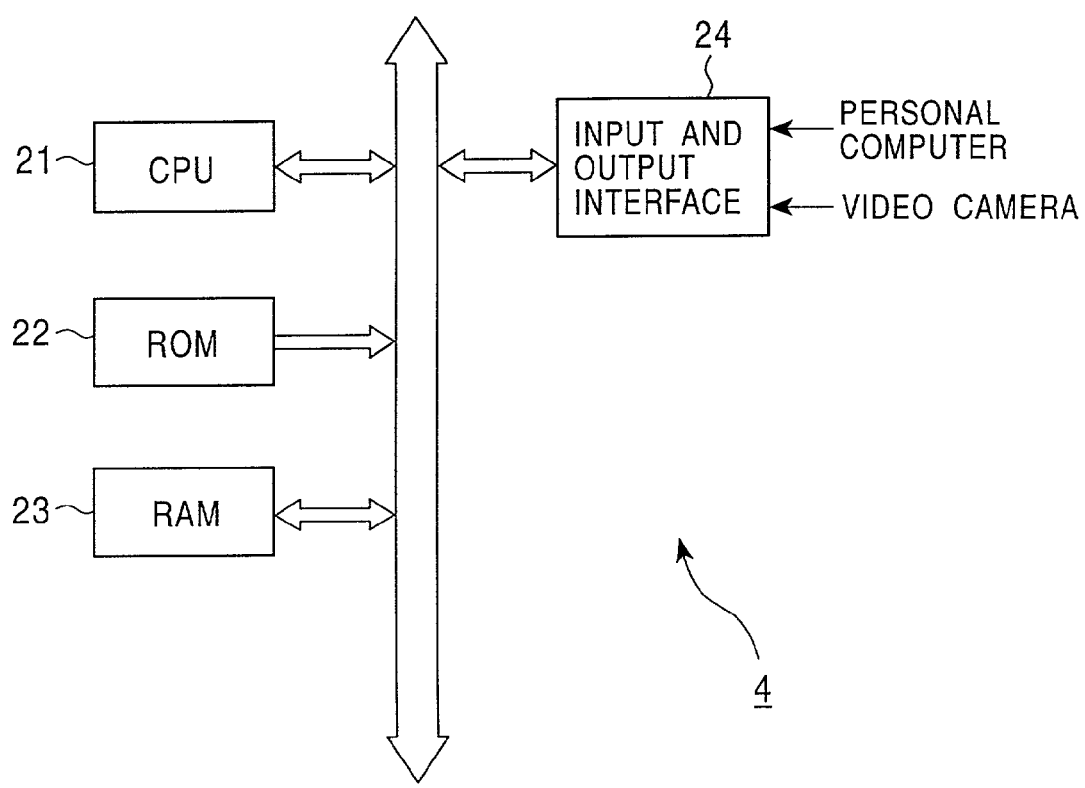
FIG. 2 is a block diagram of an image processing apparatus shown in FIG. 1.

FIG. 2 is a block diagram of the image processing apparatus 4. A CPU 21 executes various types of processing according to programs stored in a ROM 22. A RAM 23 stores data and programs required for the CPU 21 to execute the various types of processing. An input and output interface 24 reads image information sent from the video camera 3 and outputs image information to the personal computer 5.

The operation of the presentation system according to the present embodiment will be described next.

The personal computer 5 sends image information indicating an image prepared by the speaker for the presentation to the projector 6. The projector 6 projects the image indicated by the image information onto the screen 1. The projected image has a different luminance, a different color, and a different pattern from an image surrounding the screen 1.

The speaker makes the presentation while the speaker specifies positions on the projected image with the use of the pointer 2. This pointer 2 is provided with a light-emitting device (LED) at its tip. The speaker operates the pointer such that the light-emitting device emits light to show bright points on the image to clearly indicate the specified positions to the audience.

When the speaker specifies a predetermined part of the image by the pointer 2 and shows a bright point on the image, the video camera 3 captures the entire screen 1, which displays the image including the bright point. Image information indicating the captured image is sent to the image processing apparatus 4.

Processing of the sent image information, to be performed in the image processing apparatus 4 shown in FIG. 2 will be described next by referring to a flowchart shown in FIG. 3.

In a step S1, the CPU 21 extracts an image in an area showing the screen 1 from the captured image. Since the luminance, the color, and the pattern of the image projected onto the screen 1 differ from those of the image surrounding the screen 1, the image in the area showing the screen 1 and the image in the area surrounding the screen 1 can be easily determined. Therefore, the image in the area showing the screen 1 can be easily extracted.

Then, the coordinates of the four corners of the area showing the screen 1 are determined in a step S2 to a step S5.

In the step S2, the CPU 21 extracts the edges of the area showing the screen 1. Then, in a step S3, the CPU 21 applies threshold processing to the pixel values of the image information of the edges to binarize the image information. In a step S4, the CPU 21 applies Hough transform to the binarized image information of the edges to detect the four sides of the area showing the screen 1.

Figure 4:
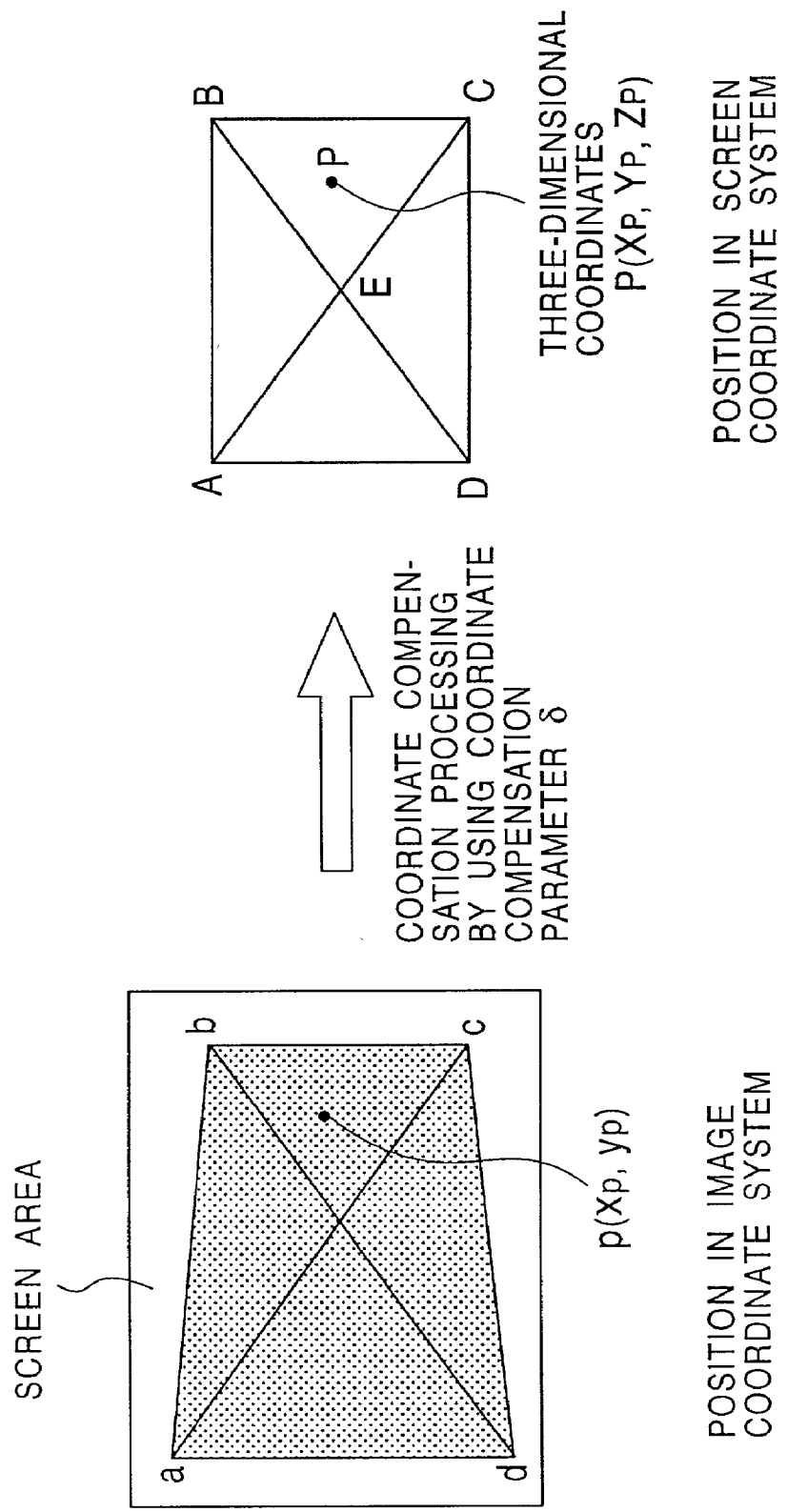
FIG. 4 is a view showing coordinate compensation processing performed in a step S1 to a step S6 shown in FIG. 3.

In the step S5, the CPU 21 obtains the intersections of the detected four sides, regards the intersections, "a," "b," "c," and "d," as the four corners of the area showing the screen 1, as shown in FIG. 4, and calculates the coordinates (hereinafter also called coordinates in an image coordinate system) of the points "a," "b," "c," and "d" on the captured image.

Next, a coordinate compensation parameter δ used for converting the coordinates of any point on the captured image to those on the screen 1 is calculated in a step S6. The CPU 21 also executes this processing.

As shown in FIG. 4, the coordinates of the intersection "e" of a diagonal line "bd" and a diagonal line "ac" of a figure "abcd" formed of the detected four-corner points "a," "b," "c," and "d" are calculated.

Vanishing points $U(x_u, y_u)$ and $V(x_v, y_v)$ are obtained from the coordinates of the points "a," "b," "c," and "d."

$$U = \frac{2\|de\|b_p - \|db\|e_p}{2\|de\| - \|db\|} \equiv (x_u, y_u) \tag{1}$$

$$V = \frac{2\|ce\|a_p - \|ca\|e_p}{2\|ce\| - \|ca\|} \equiv (x_v, y_v) \tag{2}$$

In the above expressions, ‖de‖ indicates the distance between the points "d" and "e," ‖db‖ indicates the distance between the points "d" and "b," $b_p$ indicates the coordinates of the point "b," $e_p$ indicates the coordinates of the point "e," ‖ce‖ indicates the distance between the points "c" and "e," ‖ca‖ indicates the distance between the points "c" and "a," $a_p$ indicates the coordinates of the point "a," $c_p$ indicates the coordinates of the point "c," and $x_u$, $y_u$, $x_v$, and $y_v$ indicate the x and y coordinates of the vanishing points U and V, respectively.

From the following expressions, $p_s$ and $q_s$ are obtained by the use of the x and y coordinates of the vanishing points U and V, $x_u$, $y_u$, $x_v$, and $y_v$.

$$p_s = \frac{-y_u + y_v}{x_u y_v - x_v y_u} \tag{3}$$

$$q_s = \frac{x_u - x_v}{x_u y_v - x_v y_u} \tag{4}$$

With the use of $p_s$, $q_s$, and the focal length "f" of the video camera 3, the coordinate compensation parameter δ, used for converting coordinates in the image coordinate system to those in the screen coordinate system, and the z coordinates, ZA and ZB, of the points "A" and "B" in the screen coordinate system corresponding to the points "a" and "b" in the image coordinate system are expressed in the following ways.

$$\delta = p_s \frac{Z_A}{f} x_a + q_s \frac{Z_A}{f} y_a - Z_A \quad (5)$$

$$\delta = p_s \frac{Z_B}{f} x_b + q_s \frac{Z_B}{f} y_b - Z_B \quad (6)$$

$$Z_A = \frac{\delta \cdot f}{x_a p_s + y_a q_s - f} \quad (7)$$

$$Z_B = \frac{\delta \cdot f}{x_b p_s + y_b q_s - f} \quad (8)$$

The coordinates of the points A and B are expressed in the following ways.

$$A = (x_A, y_A) \equiv \left( \frac{Z_A}{f} x_a, \frac{Z_A}{f} y_a, Z_A \right) \quad (9)$$

$$B = (x_B, y_B) \equiv \left( \frac{Z_B}{f} x_b, \frac{Z_B}{f} y_b, Z_B \right) \quad (10)$$

With the use of the expression (5) to the expression (10), the distance, ‖AB‖, between the points A and B is obtained in the following way.

$$\|AB\|^2 = \left\{ \frac{\delta x_a}{x_a p_s + y_a q_s - f} \left( 1 - \frac{x_a p_s + y_a q_s - f}{x_b p_s + y_b q_s - f} \cdot \frac{x_b}{x_a} \right) \right\}^2 + \\ \left\{ \frac{\delta y_a}{x_a p_s + y_a q_s - f} \left( 1 - \frac{x_a p_s + y_a q_s - f}{x_b p_s + y_b q_s - f} \cdot \frac{y_b}{y_a} \right) \right\}^2 + \\ \left\{ \frac{\delta f}{x_a p_s + y_a q_s - f} \left( 1 - \frac{x_a p_s + y_a q_s - f}{x_b p_s + y_b q_s - f} \right) \right\}^2 \quad (11)$$

When the left side of the expression (11) is set to (actual distance between the points A and B)$^2$, an expression (12) is obtained.

$$\left\{ \frac{\delta x_a}{x_a p_s + y_a q_s - f} \left( 1 - \frac{x_a p_s + y_a q_s - f}{x_b p_s + y_b q_s - f} \cdot \frac{x_b}{x_a} \right) \right\}^2 + \\ \left\{ \frac{\delta y_a}{x_a p_s + y_a q_s - f} \left( 1 - \frac{x_a p_s + y_a q_s - f}{x_b p_s + y_b q_s - f} \cdot \frac{y_b}{y_a} \right) \right\}^2 + \\ \left\{ \frac{\delta f}{x_a p_s + y_a q_s - f} \left( 1 - \frac{x_a p_s + y_a q_s - f}{x_b p_s + y_b q_s - f} \right) \right\}^2 = \\ \text{(actual distance between the points } A \text{ and } B)^2 \quad (12)$$

The value of the focal length "f" of the video camera 3, which is known, is substituted for "f" in the expression (12) to obtain the coordinate compensation parameter δ.

Then, the position of the bright point in the image coordinate system is converted to that of the bright point in the screen coordinate system in a step S7 to a step S12.

In the step S7, the CPU 21 applies threshold processing to the pixel values of the captured image by the use of a first threshold to binarize it. Then, in a step S8, the CPU 21 applies threshold processing to the variance condition of the pixels having pixel values equal to or more than the first threshold, by the use of a second threshold. In a step S9, the CPU 21 determines whether a bright point exists in the image. The CPU 21 determines that when the variance of the pixels having pixel values equal to or more than the first threshold is equal to or less than the second threshold, a bright point exists; and the CPU 21 determines when the variance is more than the second threshold, a bright point does not exist. When it is determined that a bright point exists, the procedure proceeds to a step S10. When it is determined that a bright point does not exist, the procedure proceeds to a step S13.

In the step S10, the CPU 21 measures the coordinates of an area (bright point "p") where it has been determined that the bright point exists in the image. Since the bright point has the area, a plurality of coordinates are obtained.

In a step S11, the CPU 21 calculates the averages of all the coordinates of the bright point "p," which have been obtained in the area of the bright point, and regards the averages as the coordinates ($x_p$, $y_p$) of the bright point "p" in the image.

In the step S12, the CPU 21 obtains the coordinates ($X_p$, $Y_p$, $Z_p$) of the point "P" on the screen 1 in the three-dimensional space, which are expected from the coordinates ($x_p$, $y_p$) of the bright point "p" in the image. The Z coordinate $Z_p$ of the point P can be expressed in the following way by the use of the coordinate compensation parameter δ.

$$Z_p = \frac{\delta \cdot f}{x_p p_s + x_p q_s - f} \quad (13)$$

The three-dimensional coordinates of the expected point "P" on the screen 1 can be obtained from the following expression (14) or (15).

$$P = \left( \frac{Z_P}{f} x_p, \frac{Z_P}{f} y_p, Z_P \right) \quad (14)$$

$$P' = \left( \frac{\overline{AB}}{\|AB\|} \cdot \overline{AP}, \frac{\overline{AD}}{\|AD\|} \cdot \overline{AP} \right) \quad (15)$$

In a step S13, the blinking pattern of the bright point obtained when time elapses is detected.

Figure 5:
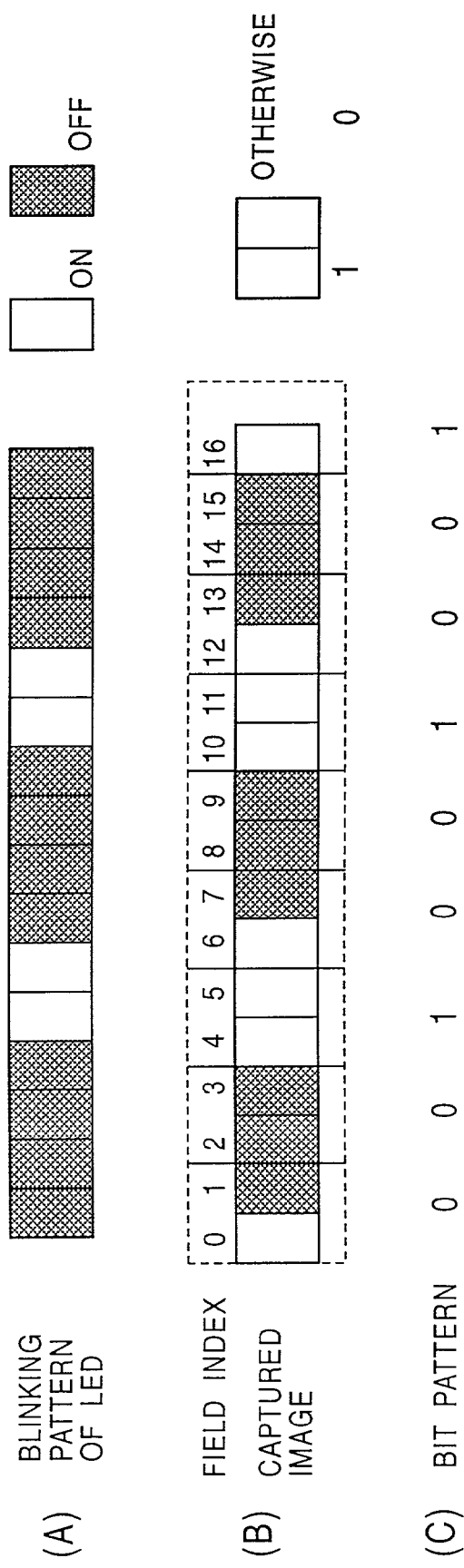
FIG. 5 is a view showing processing for detecting the blinking pattern of a bright point in a step S13 shown in FIG. 3.

The unit period (ON period or OFF period) of the blinking pattern of a bright point which the light-emitting device disposed at the tip of the pointer 2 generates has a margin. This is because, since it is generally considered that the period of the blinking time pattern of the bright point is not synchronized with the period when an image capture section captures pixels in the input and output interface 24 of the image processing apparatus 4, the blinking pattern of the bright point is prevented from being erroneously detected due to this synchronization error. In the present embodiment, the unit period of the blinking pattern of the bright point has a margin of one vertical drive period (VD, field period, which equals 1/60 seconds in the NTSC system) and the unit period is set to 2 VDs or longer. FIG. 5(A) shows the blinking pattern of a bright point (LED). In this example, the ON period and the OFF period are set to multiples of (n times where n is an integer) 2 VDs. FIG. 5(B) shows a result obtained when the blinking pattern of the bright point (LED) shown in FIG. 5(A) is captured.

In the step S13, the CPU 21 calculates the logical product of a pixel value in the current field line and that in the line one field before (or one field after), and determines that a bright point exists only when both values are ON. This eliminates an erroneous detection caused by the synchronization error of the periods. FIG. 5(C) shows the bit pattern of the binarization result obtained from the captured blinking pattern of the bright point shown in FIG. 5(B) by the image processing apparatus 4 with the synchronization error being eliminated. One bit is obtained in every 2 VDs (one frame).

In a step S14, the CPU 21 sends the obtained bit pattern indicating the blinking pattern of the bright point to the personal computer 5.

In a step S15, the CPU 21 determines whether the speaker has finished the presentation, namely, whether it is necessary to apply processing to the image including the bright point which the speaker has specified. When it is determined that it is not necessary, the processing is terminated. When it is determined that it is necessary, the procedure returns to the step S7, and the above operations, that is, the processing from the step S7 to the step S15, are repeatedly executed.

As described above, the image processing apparatus 4 sends the bit pattern indicating the blinking pattern of the bright point as well as the position of the bright point generated by the pointer 2 to the personal computer 5.

Another processing to be performed by the image processing apparatus 4, which sends the bit pattern indicating the blinking pattern of the bright point and the position of the bright point generated by the pointer 2 to the personal computer 5, will be described next by referring to a flowchart shown in FIG. 6. Since processing in a step S31 to a step S35 is the same as the processing from the step 1 to the step S5 shown in FIG. 3, descriptions thereof will be omitted.

In a step S36, the CPU 21 calculates vanishing points from the image on the screen 1. Processing in the CPU 21 for calculating vanishing points from the image on the screen 1 will be described by referring to FIG. 7. In the following description, an image coordinate system has the origin at the point of view of the video camera 3.

Figure 7:
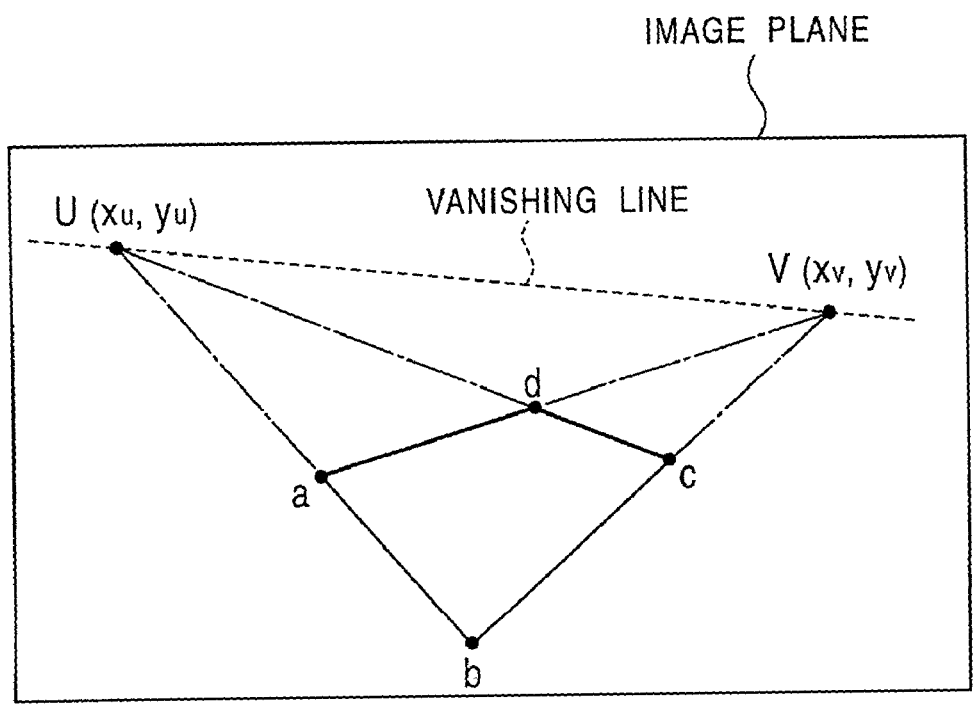
FIG. 7 is a view showing vanishing points.

As shown in FIG. 7, a vanishing point $U(x_u, y_u)$ is an intersection of a line "ab" passing a point "a" and a point "b" on the image plane and a line "cd" passing a point "c" and a point "d," and a vanishing point $V(x_v, y_v)$ is an intersection of a line "ad" passing a point "a" and a point "d" and a line "bc" passing a point "b" and a point "c." The line "ab" is expressed by an expression (16), the line "cd" is expressed by an expression (17), the line "ad" is expressed by an expression (18), and the line "bc" is expressed by an expression (19).

$$\alpha_1 x + \beta_1 y = \gamma_1 \quad (16)$$

$$\alpha_2 x + \beta_2 y = \gamma_2 \quad (17)$$

$$\alpha_3 x + \beta_3 y = \gamma_3 \quad (18)$$

$$\alpha_4 x + \beta_4 y = \gamma_4 \quad (19)$$

Therefore, the coordinates of the vanishing point $U(x_u, y_u)$ are calculated by an expression (20) and an expression (21), and the coordinates of the vanishing point $V(x_v, y_v)$ are calculated by an expression (22) and an expression (23).

$$x_u = (\beta_2 \gamma_1 - \beta_1 \gamma_2)/(\alpha_1 \beta_2 - \alpha_2 \beta_1) \quad (20)$$

$$y_u = (\alpha_1 \gamma_2 - \alpha_2 \gamma_1)/(\alpha_1 \beta_2 - \alpha_2 \beta_1) \quad (21)$$

$$x_v = (\beta_4 \gamma_3 - \beta_3 \gamma_4)/(\alpha_3 \beta_4 - \alpha_4 \beta_3) \quad (22)$$

$$y_v = (\alpha_3 \gamma_4 - \alpha_4 \gamma_3)/(\alpha_3 \beta_4 - \alpha_4 \beta_3) \quad (23)$$

When the coordinates of the point "a" are set to $(x_1, y_1)$, the coordinates of the point "b" are set to $(x_2, y_2)$, the coordinates of the point "c" are set to $(x_3, y_3)$, and the coordinates of the point "d" are set to $(x_4, y_4)$ on the image, $\alpha_1, \beta_1, \gamma_1, \alpha_2 \beta_2, \gamma_2, \alpha_3, \beta_3, \gamma_3, \alpha_4, \beta_4, \delta_4, \gamma_4$ are calculated by an expression (24), an expression (25), an expression (26), an expression (27), an expression (28), an expression (29), an expression (30), an expression (31), an expression (32), an expression (33), an expression (34), and an expression (35), respectively.

$$\alpha_1 = y_1 - y_2 \quad (24)$$

$$\beta_1 = -(x_1 - x_2) \quad (25)$$

$$\gamma_1 = x_2 y_1 - x_1 y_2 \quad (26)$$

$$\alpha_2 = y_3 - y_4 \quad (27)$$

$$\beta_2 = -(x_3 - x_4) \quad (28)$$

$$\gamma_2 = x_4 y_3 - x_3 y_4 \quad (29)$$

$$\alpha_3 = y_1 - y_4 \quad (30)$$

$$\beta_3 = -(x_1 - x_4) \quad (31)$$

$$\gamma_3 = x_4 y_1 - x_1 y_4 \quad (32)$$

$$\alpha_4 = y_2 - y_3 \quad (33)$$

$$\beta_4 = -(x_2 - x_3) \quad (34)$$

$$\gamma_4 = x_3 y_2 - x_2 y_3 \quad (35)$$

Figure 8:
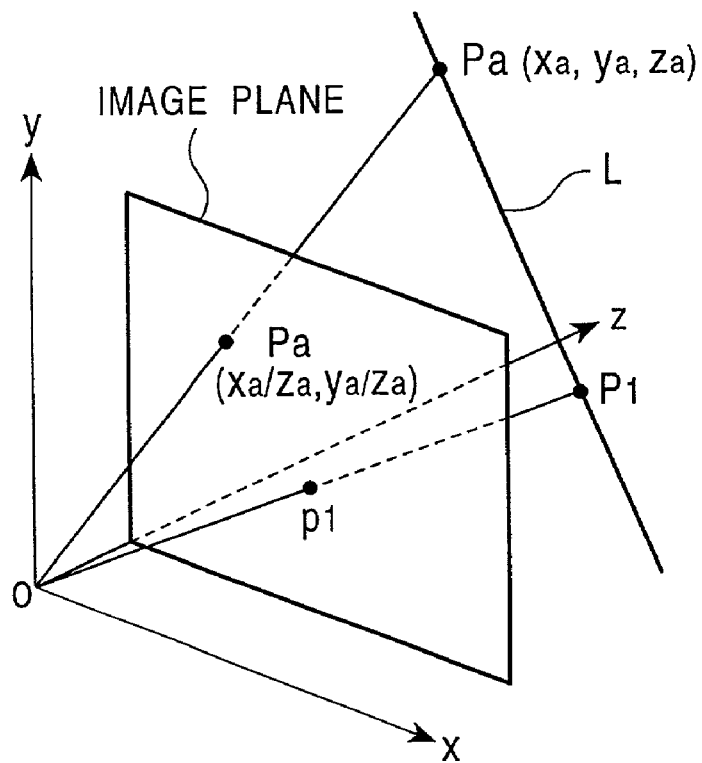
FIG. 8 is a view showing processing for calculating the gradient of a screen 1.

In a step S37, the CPU 21 calculates the gradient of the screen 1 from the vanishing point $U(x_u, y_u)$ and the vanishing point $V(x_v, y_v)$. As shown in FIG. 8, an image coordinate system is specified such that the z axis of the image coordinate system is perpendicular to the image plane and the image plane is disposed at z=1 in the image coordinate system so that coordinate points in the image coordinate system can be normalized by the focal length "f" of the lens. A point $P_a(x_a, y_a, z_a)$ in a space is projected to a point $p_a(x_a/z_a, y_a/z_a)$ on the image plane by perspective transformation.

A point $P_1$ on a line L which passes the point $P_a$ and has a direction vector $v=(v_x, v_y, v_z)$ is expressed by an expression (36), and a point $p_1$ generated by projecting the point $P_1$ onto the image plane is expressed by an expression (37).

$$P_1 = P_a + tv \quad (36)$$
$$= (x_a + tv_x, y_a + tv_y, z_a + tv_z)$$

$$p_1 = ((x_a + tv_x)/(z_a + tv_z), (y_a + tv_y)/(z_a + tv_z)) \quad (37)$$
$$= ((x_a/t + v_x)/(z_a/t + v_z), (y_a/t + v_y)/(z_a/t + v_z))$$

Since a vanishing point is a projection image obtained when a line having a direction vector is extended toward the infinity, $p_1$ obtained when t becomes the infinity is a vanishing point and expressed by an expression (38).

$$\lim_{t \to \infty} p_1 = \lim_{t \to \infty}((x_a/t + v_x)/(z_a/t + v_z), (y_a/t + v_y)/(z_a/t + v_z)) \quad (38)$$
$$= (v_x/v_z, v_y/v_z)$$

Since the normal vector $n(p_s, q_s, -1)$ of a plane π in the space is perpendicular to the direction vector $u(u_x, u_y, u_z)$ of any line on the plane π, the following expression (39) is satisfied, and an expression (40) is obtained from the expression (39) (hereinafter, a variable with an arrow disposed thereabove indicates a vector).

$$\vec{n} \cdot \vec{u} = p_s u_x + q_s \cdot u_y - u_z = 0 \quad (39)$$

$$p_s(u_x/u_z) + q_s(u_y/u_z) = 1 \quad (40)$$

In the expression (40), $(u_x/u_z)$ and $(u_y/u_z)$ indicate a vanishing point as shown in the expression (38). Since the direction vector u can be any vector, the expression (40) indicates a set of vanishing points on the image plane, namely, a vanishing line. Conversely, when a vanishing line is expressed by an expression of ax+by=1, the gradient of a plane having this vanishing line is (a, b, −1). Therefore, the vanishing line is obtained by an expression (41) with the use of the vanishing points $U(x_u, y_u)$ and $V(x_v, y_v)$ calculated from the quadrangle "abcd," which is a projection image of the quadrangle "ABCD."

$$((-y_u+y_v)/(x_u y_v - x_v y_u))x + ((x_u - x_v)/(x_u y_v - x_v y_u))y = 1 \quad (41)$$

The normal vector $n_{abcd}$ of the quadrangle "ABCD" can be expressed by an expression (42).

$$\vec{n}_{abcd} = ((-y_u+y_v)/(x_u y_v - x_v y_u), (x_u - x_v)/(x_u y_v - x_v y_u), -1) \quad (42)$$

The normal vector $n_{abcd}$ is normalized to obtain a vector $$\vec{N} = \frac{\vec{n}_{abcd}}{\|\vec{n}_{abcd}\|} \quad (43)$$

In this expression, an operator ‖vector‖ indicates an operator for obtaining the absolute value of the vector.

As described above, the CPU 21 calculates the gradient of the screen 1 from the image on the screen 1.

Figure 9:
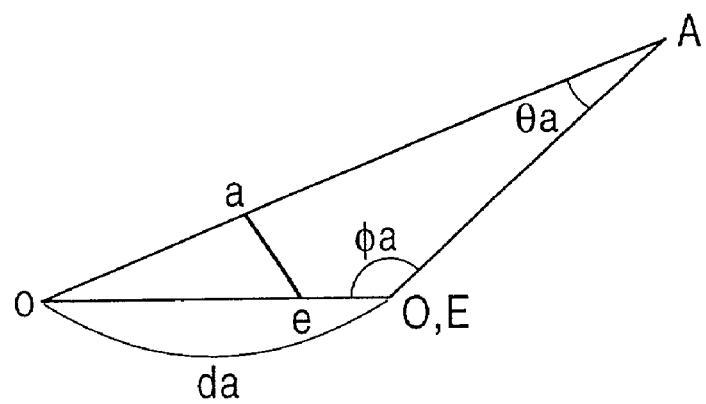
FIG. 9 is a side view of a video camera 3 and the screen 1.

In a step S38, the CPU 21 obtains the distance from the video camera 3 to the screen 1 according to the gradient of the screen 1. FIG. 9 is a side view of the video camera 3 and the screen 1. The distance $d_a$ between an origin "o" of the image coordinate system, which is calculated from the point "a," and the origin "O" of the screen coordinate system is calculated from an expression (44).

$$d_a = (\|AE\| \sin \theta_a)/(\sin(\theta_a + \Phi_a)) \quad (44)$$

In this expression, ‖AE‖ is known, $\theta_a$ is defined by an expression (45), and $\Phi_a$ is defined by an expression (46).

$$\theta_a = \angle oEA \quad (45)$$

$$\Phi_a = \angle oAE \quad (46)$$

In the same way, the distance $d_b$ between an origin "o" of the image coordinate system, which is calculated from the point "b," and the origin "O" of the screen coordinate system, the distance $d_c$ between an origin "o" of the image coordinate system, which is calculated from the point "c," and the origin "o" of the screen coordinate system, and the distance $d_d$ between an origin "o" of the image coordinate system, which is calculated from the point "d," and the origin "O" of the screen coordinate system, are calculated. The average of the distance $d_a$, the distance $d_b$, the distance $d_c$, and the distance $d_d$ is used as the distance $d_{ave}$ between the origin "o" of the image coordinate system and the origin "O" of the screen coordinate system.

A parallel movement vector "t" from the origin "o" of the image coordinate system to the origin "O" (the center of the quadrangle "ABCD") of the screen coordinate system is calculated by an expression (47).

$$\vec{t} = d_{ave} \frac{\vec{oe}}{\|\vec{oe}\|} \quad (47)$$

As described above, the position $(X_m, Y_m, Z_m)$ and the angle $(Rx_m, Ry_m, Rz_m)$ of the screen 1 in the three-dimensional space are calculated from the position of the screen in the image. In the description of the processing for calculating the position and the angle of the screen 1, the image plane is disposed at z=1 in the image coordinate system. As shown in the expressions used in the description for FIG. 3, when $p_s$ and $q_s$ are compensated by the focal length "f" of the video camera 3, even if the video camera does not have a focal length "f" of 1, the correct position and the correct angle are calculated.

Figure 3:
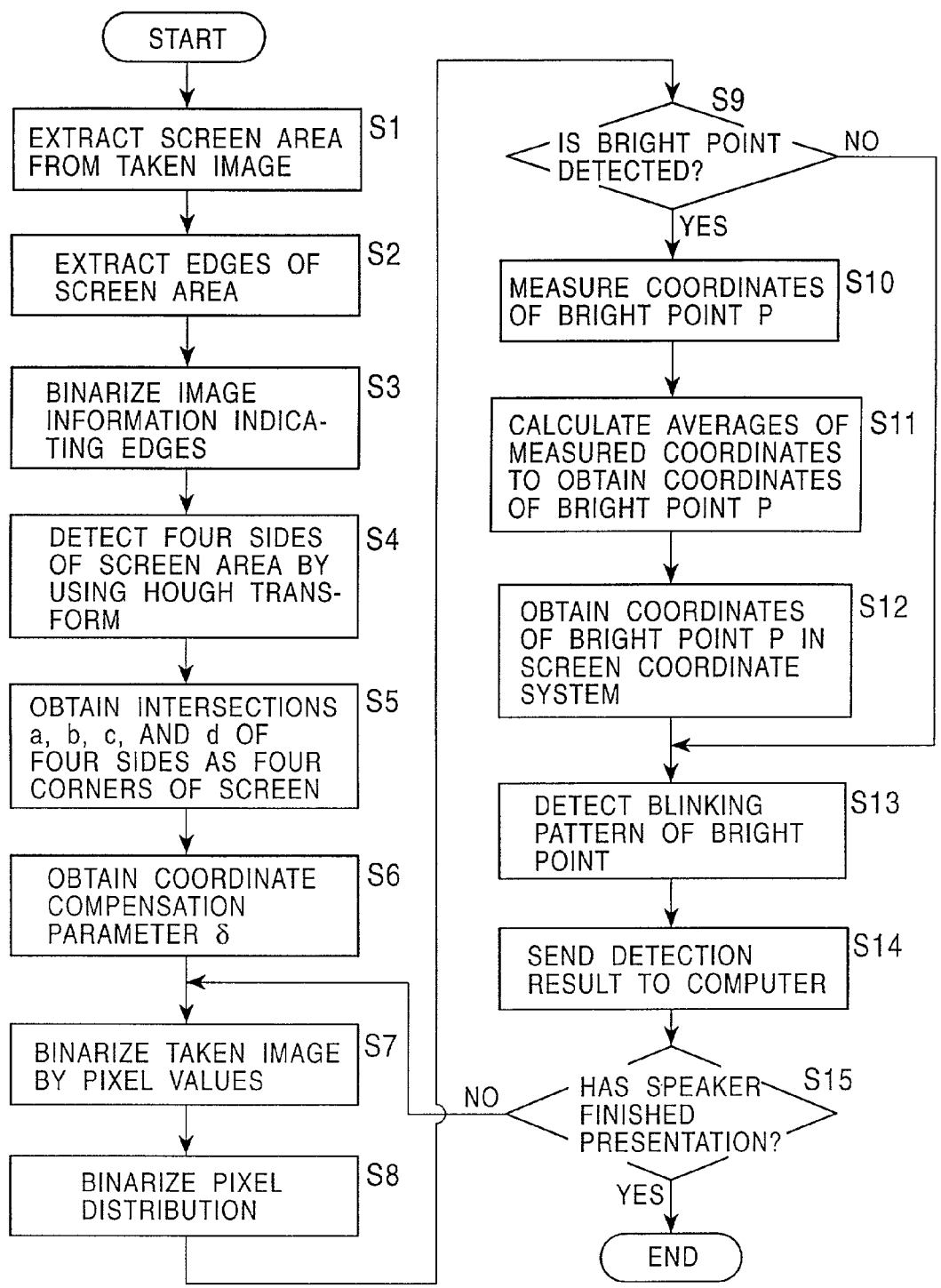
FIG. 3 is a flowchart of an image processing method for the image processing apparatus shown in FIG. 2.

Since processing from a step S39 to a step S48 is the same as the processing from the step S6 to the step S15 shown in FIG. 3, descriptions thereof will be omitted.

Figure 6:
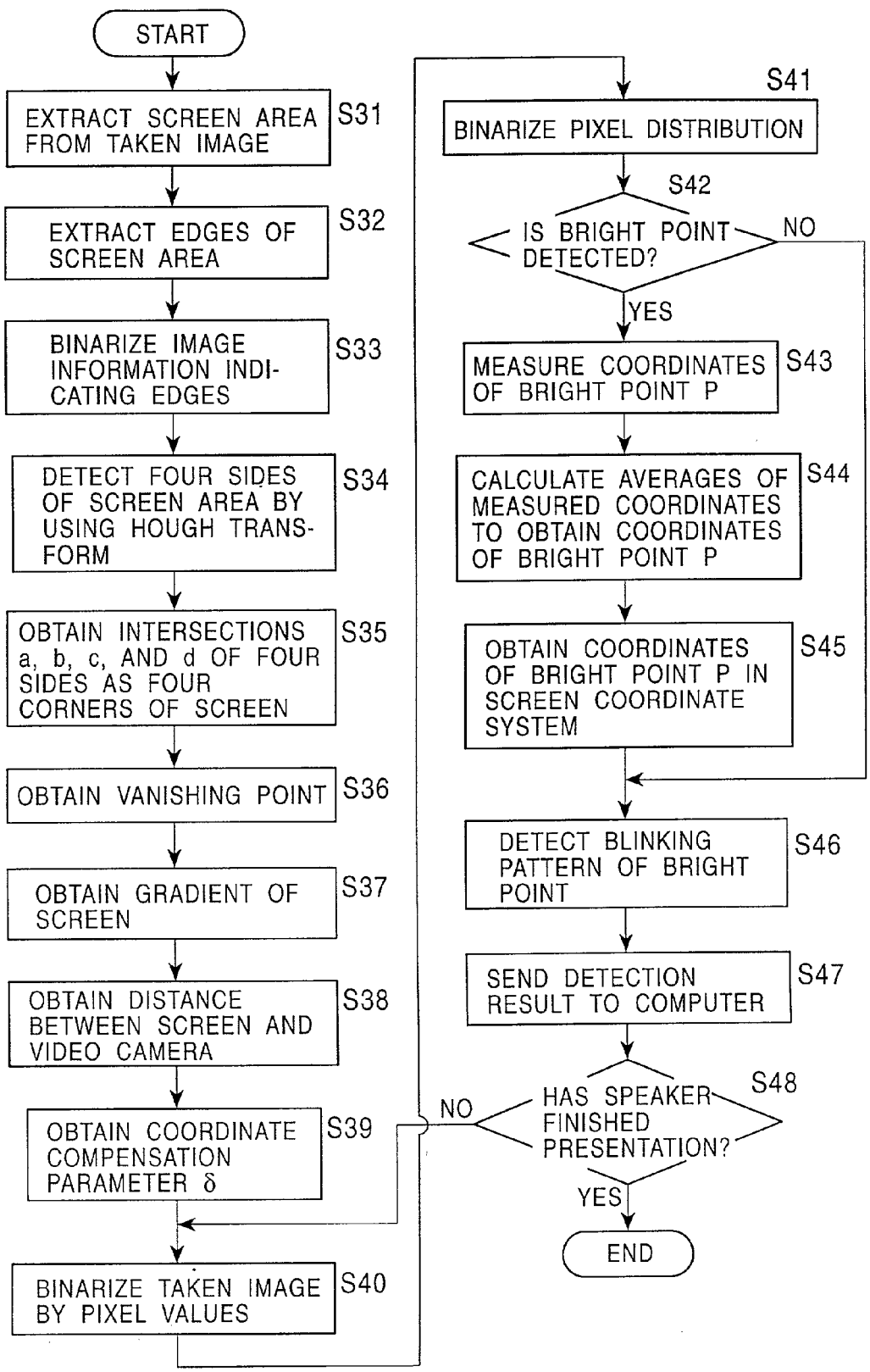
FIG. 6 is a flowchart of another image processing method for the image processing apparatus 4.

As described above, also in the processing described by referring to the flowchart shown in FIG. 6, the image processing apparatus 4 sends the bit pattern indicating the blinking pattern of a bright point as well as the position of the bright point generated by the pointer 2 to the personal computer 5.

The personal computer 5 assigns the detected bit pattern to a command for controlling the personal computer 5. It is not necessary that all of periods required to detect commands are the same. It is necessary to promptly detect frequently used commands, but in many cases, it may take some time period to detect commands which are not frequently used. Therefore, short bit patterns are assigned to the frequently used commands, and relatively long bit patterns are assigned to the commands which are not frequently used in order to shorten the total detection time.

In the present embodiment, a pattern of "010" is assigned to a state in which a left button (not shown) of the pointer 2 is pressed, a pattern of "0001" is assigned to a state in which a right button (not shown) of the pointer 2 is pressed, and to avoid an erroneous detection, a pattern of "01" is assigned to a state in which no button is pressed. When the number of buttons is increased, the number of patterns can be increased in the same way.

The personal computer 5 sends the image information corresponding to the position and the blinking pattern of a bright point which the speaker specifies, to the projector 6. The projector 6 projects the received image information onto the screen 1. For example, the position where the speaker specifies is marked on the screen 1, and is immediately moved on the screen when the bright point is moved as time elapses, so that the position where the speaker specifies can be spontaneously indicated. The assignment can be made, for example, such that the projector 6 displays the next scene when the speaker moves the bright point to a predetermined position (for example, where an arrow is shown on the screen) and presses the left button of the pointer 2. The assignment can be made, for example, such that the projector 6 displays the last scene when the speaker moves the bright point to the same position and presses the right button of the pointer 2.

Until the speaker finishes the presentation, the above operations are repeated. When the speaker finishes the presentation, the above processing in the presentation system is finished.

As described above, in the presentation system of the present embodiment, the captured image is binarized by applying the threshold processing to the pixel values, and it is determined that a bright point exists when the variance of pixels having pixel values equal to or greater than the first threshold is equal to or smaller than the second threshold.

Therefore, points other than the bright point specified by the pointer 2 are prevented from being erroneously detected on the screen 1.

Since coordinates of an image projected onto the screen 1 is compensated by the coordinate compensation parameter δ, used for converting coordinates on a captured image to those on the screen 1, three-dimensional coordinates on the screen 1 can be correctly detected.

Since the blinking pattern of the bright point has a margin of one field and the time pattern of the bright point is detected by the logical product of the value of a pixel on the current field line and that of the pixel on the line one field before, an erroneous detection caused by a synchronization error between the period of the blinking pattern of the bright point and the period of the image capture section is avoided.

Therefore, the position and the blinking pattern of the bright point can be correctly detected from the captured image.

Since frequently used commands are made short when the personal computer 5 controls the position and the blinking pattern of the detected bright point, a processing time required for reading a predetermined command (pattern) among many commands (patterns) is reduced.

Therefore, when the speaker specifies a position on an image projected onto the screen 1, by the use of the pointer 2, a processing time required for displaying a picture indicating the position and the blinking pattern of a bright point specified on the image is reduced.

Positions can be immediately marked correspondingly to the trace of a bright point specified in an image on the screen 1.

Therefore, according to the presentation system of the present embodiment, when the speaker makes a presentation by using an image, the audience can immediately recognize a position which the speaker specifies on the screen 1. The system provides easy-to-understand presentations.

Second Embodiment

Whereas an image displayed on the screen 1 is captured as is in the presentation system according to the first embodiment, the video camera 3 captures an image on the screen 1 by a flow pickup method and the image processing apparatus 4 detects the position and the blinking time pattern of a bright point in a presentation system according to a second embodiment.

The presentation system according to the present embodiment differs from that of the first embodiment in a method for capturing the blinking pattern of a bright point in the video camera 3 and an image processing method for detecting the position and the blinking pattern of the bright point in the image processing apparatus 4. The presentation system according to the present embodiment has the same structure as that of the first embodiment.

The method for capturing the blinking pattern of a bright point and the image processing method for detecting the position and the blinking pattern of the bright point in the present embodiment will be described below.

A flow pickup method used in the video camera 3 will be described first. The flow pickup method means a capture method in which the output of a photodiode constituting each pixel is transferred to a vertical transfer CCD a plurality of times during one field period in a CCD pickup device built in the video camera 3. Conversely, in a normal pickup method, the output of a photodiode constituting each pixel is transferred to the vertical transfer CCD only once during one field period.

Figure 10:
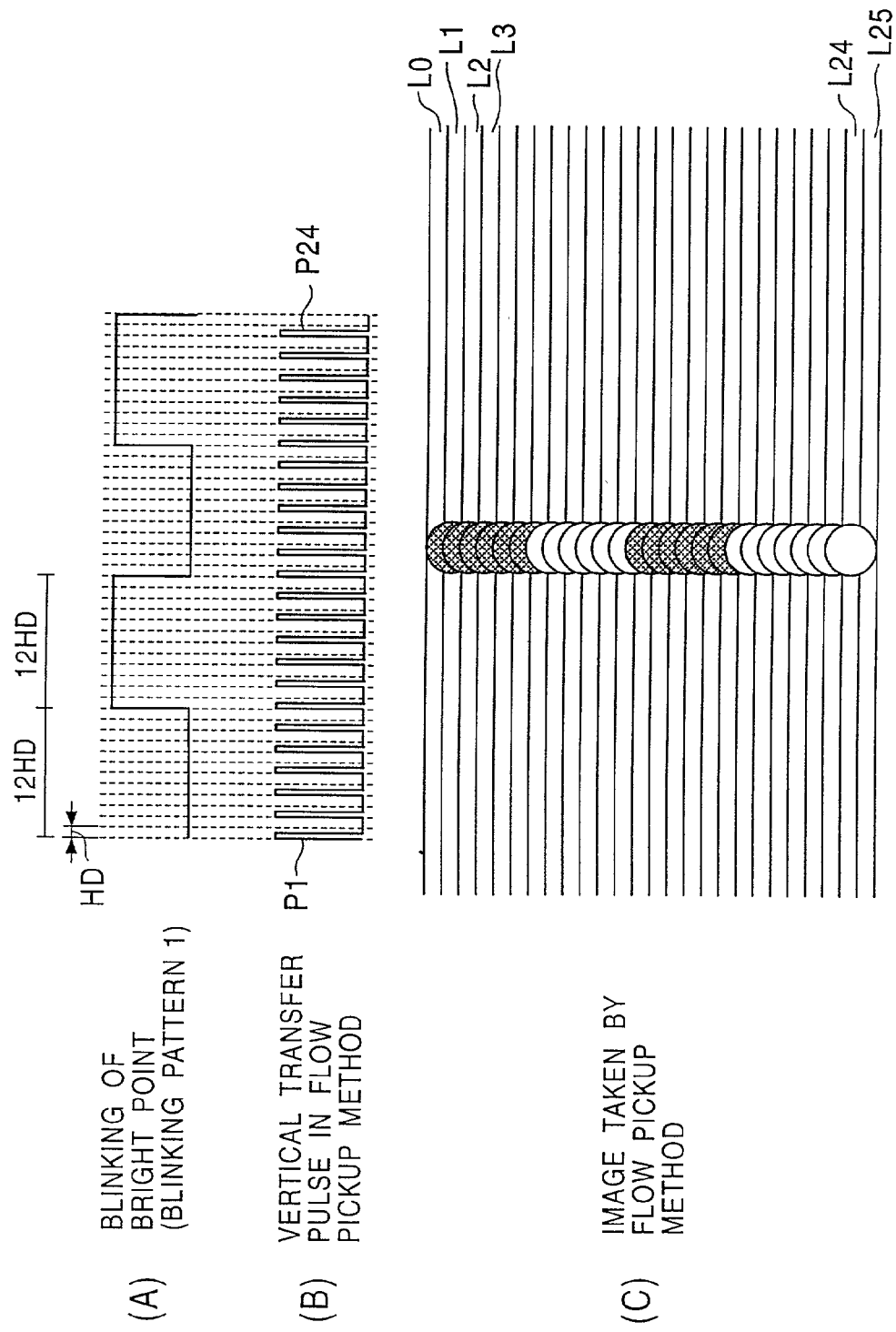
FIG. 10 is a view showing a flow pickup method.

Therefore, as shown in FIG. 10(A), for example, when a bright point is turned on for 12 horizontal scanning periods (HDs) and is turned off for the next 12 HDs, and this pattern is repeated twice in one field period, only one light-emitting point is captured if the normal pickup method is used. When the video camera 3 captures the bright point by the flow pickup method and the output of a photodiode constituting each pixel is transferred to the vertical transfer CCD every two HDs, however, the image obtained as a result shows a plurality of light-emitting points in one field as shown in FIG. 10(C). In this example, a light-emitting point is set to have a three-line size on a captured image.

Figure 11:
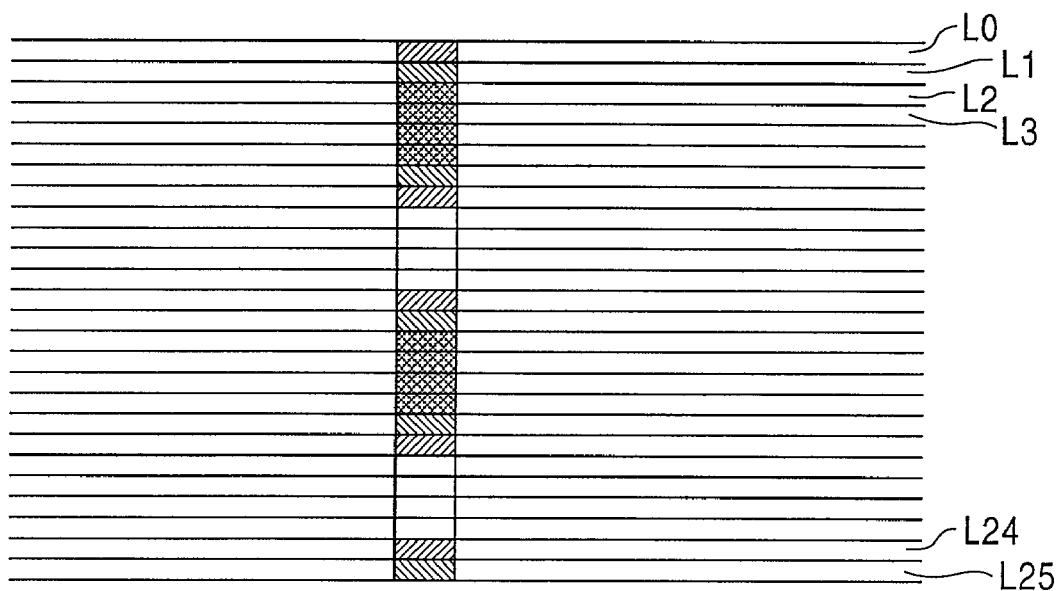
FIG. 11 is another view showing the flow pickup method.

When the image shown in FIG. 10(C) is output from the video camera 3 to the image capture section of the image processing apparatus 4, the image capture section applies capture processing to the image to generate an image shown in FIG. 11. As described above, since a light-emitting point has a three-line size, the image of each output overlaps with those output immediately before and after, and the luminance of the pixel in the captured image is gradually changed.

Figure 12:
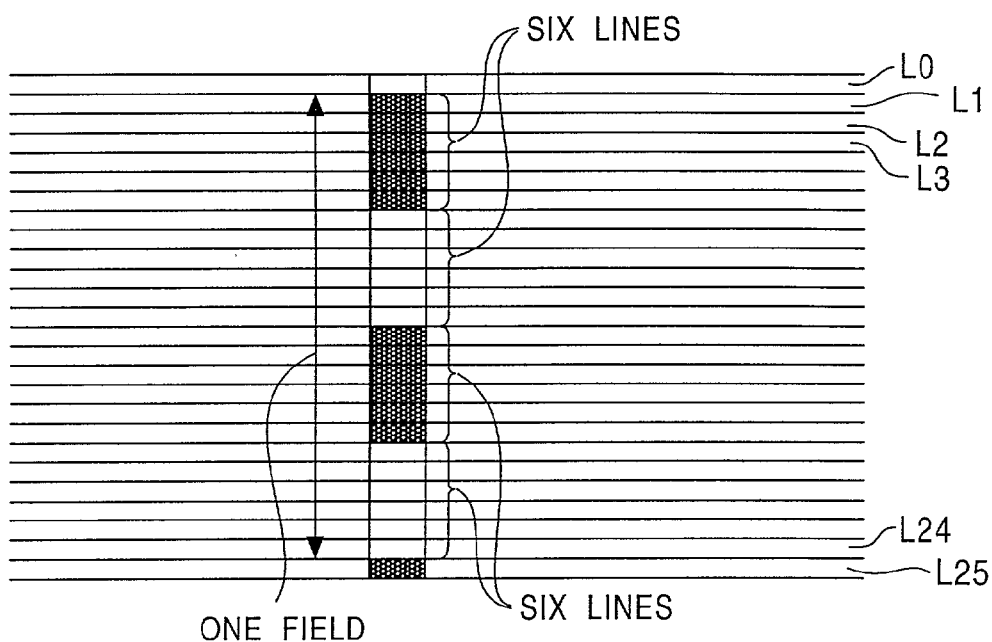
FIG. 12 is still another view showing the flow pickup method.

When the image shown in FIG. 11 is output from the image capture section to the image processing apparatus 4, the image processing apparatus 4 applies binarization processing to the image to generate an image shown in FIG. 12. In this case, luminance "A" and luminance "B" in the image shown in FIG. 11 are changed to luminance "L," and luminance "C" and luminance "D" are changed to luminance "H." The pixel value of a pixel having luminance "H" is encoded to "1" and the pixel value of a pixel having luminance "L" is encoded to "0."

As described above, luminance changes generated in a time manner twice in one field period are converted to two spatial changes by the flow pickup method. In the present embodiment of the present invention, the state of a bright point is observed according to this principle.

A procedure for executing synchronization-error compensation processing in the image processing apparatus 4 will be described next.

The images shown in FIG. 10(C), FIG. 11, and FIG. 12 are captured when the timing of the blinking pattern of the bright point is synchronized with the capture timing of the video camera 3 in the flow pickup method. On the other hand, if a synchronization error of 0.5 lines occurs, an image shown in FIG. 13 is captured, for example, instead of the image shown in FIG. 10(C).

Figure 13:
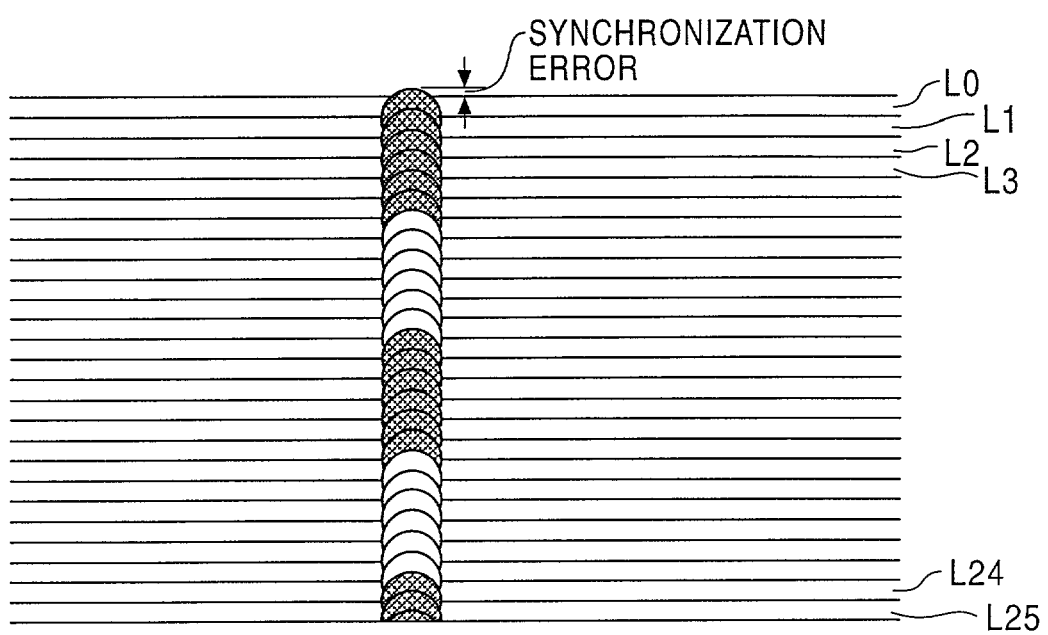
FIG. 13 is a view of an image having a synchronization error.
Figure 14:
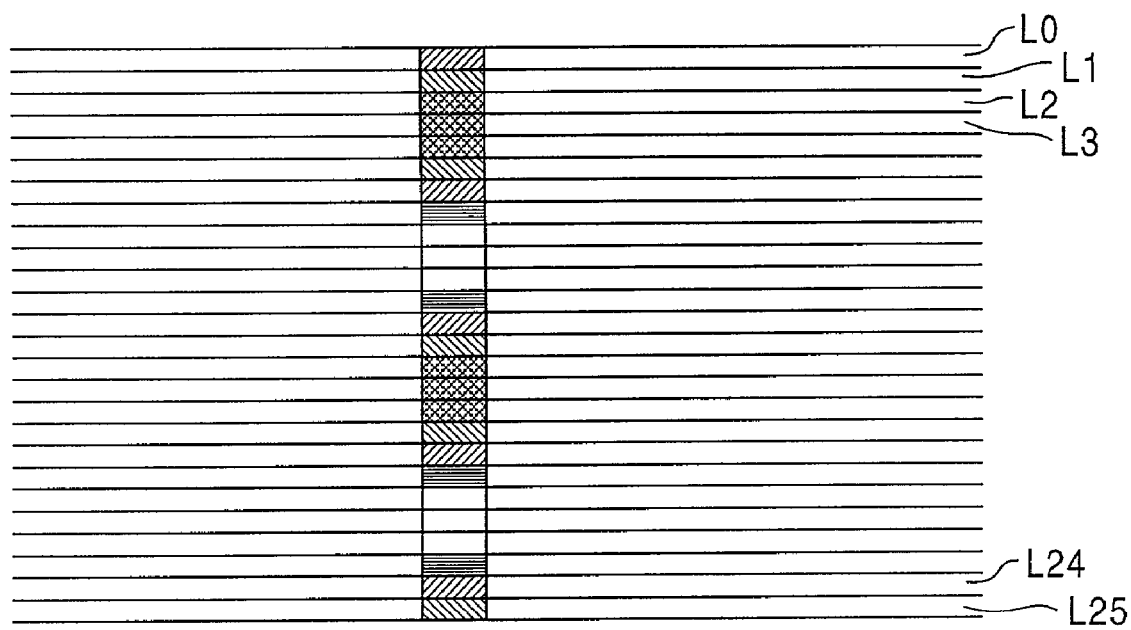
FIG. 14 is another view of the image having the synchronization error.

The image capture section of the image processing apparatus 4 applies the capture processing to the image shown in FIG. 13 to covert it to an image shown in FIG. 14. The image processing apparatus 4 then applies the binarization processing to the image shown in FIG. 14 to convert it to an image shown in FIG. 15. Whereas the blinking pattern of the bright point has six-line luminance "L" and six-line luminance "H" as shown in FIG. 12, the bright point is captured as shown in FIG. 15 such that it has five-line luminance "L" and seven-line luminance "H." In this case, luminance "A" and luminance "B" in the image shown in FIG. 14 are changed to luminance "L," and luminance "C," luminance "D," and luminance "E" are changed to luminance "H." The pixel value of a pixel having luminance "H" is encoded to "1" and the pixel value of a pixel having luminance "L" is encoded to "0."

Figure 15:
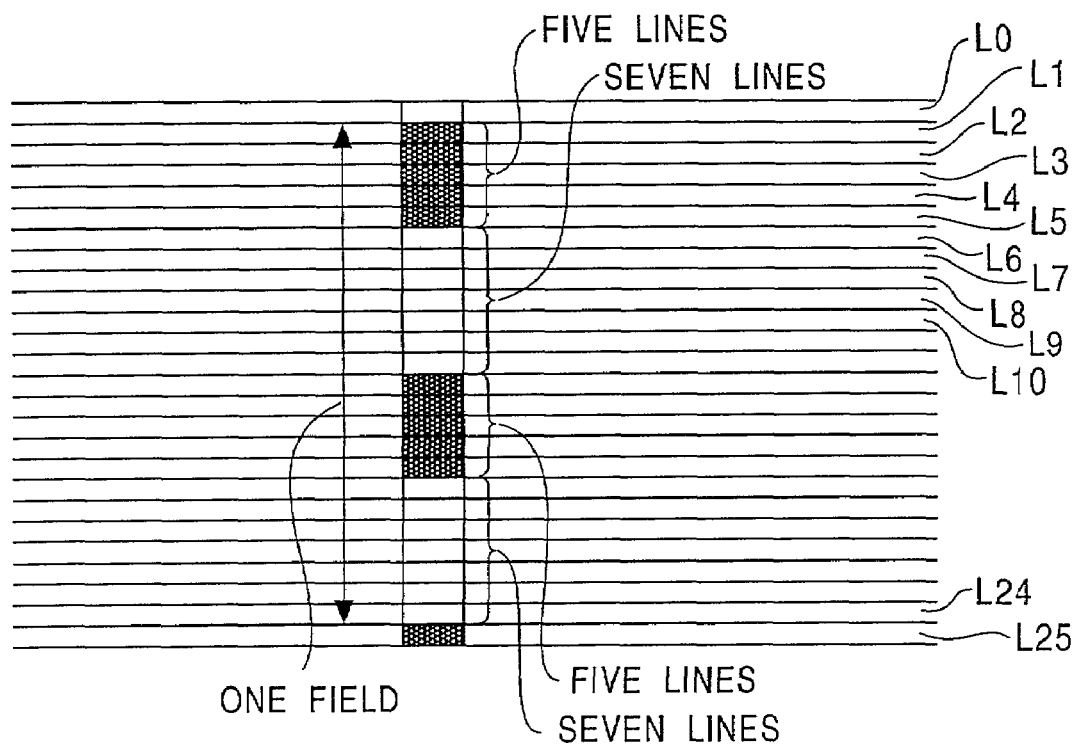
FIG. 15 is still another view of the image having the synchronization error.

The image processing apparatus 4 applies synchronization-error compensation processing to the image shown in FIG. 15 to covert it to an image which correctly shows the blinking pattern of the bright point as shown in FIG. 10(C).

Figure 16:
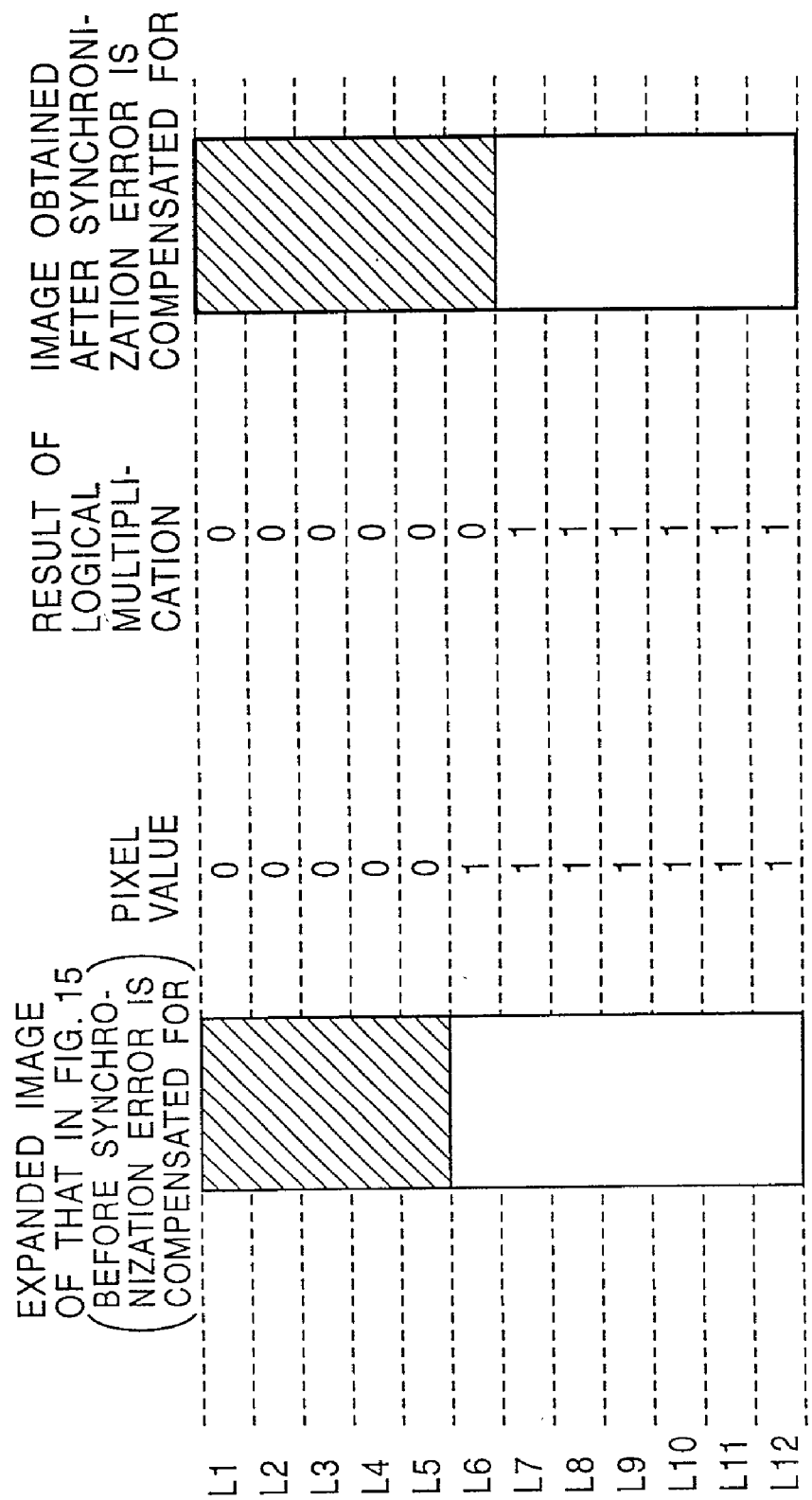
FIG. 16 is a view showing synchronization-error compensation processing.

The image processing apparatus 4 reads a pixel value "0" in a line L5 in the image shown in FIG. 15 and reads a pixel value "0" in a line L4, which is one line before the line L5, as shown in FIG. 16 which displays an expanded part of FIG. 15.

The image processing apparatus 4 obtains the logical product of the two read pixel values "0" and sets a pixel value in a new image (image obtained after the synchronization error is compensated for) to the result "0."

The image processing apparatus 4 reads a pixel value "1" in a line L6 in the image shown in FIG. 15 and reads a pixel value "0" in the line L5, which is one line before the line L6. The image processing apparatus 4 obtains the logical product of the two read pixel values "1" and "0," and sets the pixel value corresponding to the line L6 in the image obtained after the synchronization error is compensated for to the result "0."

As described above, the image processing apparatus 4 reads a pixel value in each line, calculates the logical product of a pixel value in a line and that in the line one line before, and sets a pixel value in a new image to the calculation result to convert the image shown in FIG. 13 to the image shown in FIG. 10(C).

In the above description, the logical product of a pixel value in a line and that in the line one line before is calculated and a pixel value in a new image is set to the calculation result. It is also possible that the logical product of a pixel value in a line and that in the line one line after is calculated and a pixel value in a new image is set to the calculation result.

A procedure for detecting the position of the bright point by the use of the image data converted to a spatial pattern, which is obtained as described above, will be described next.

Figure 17:
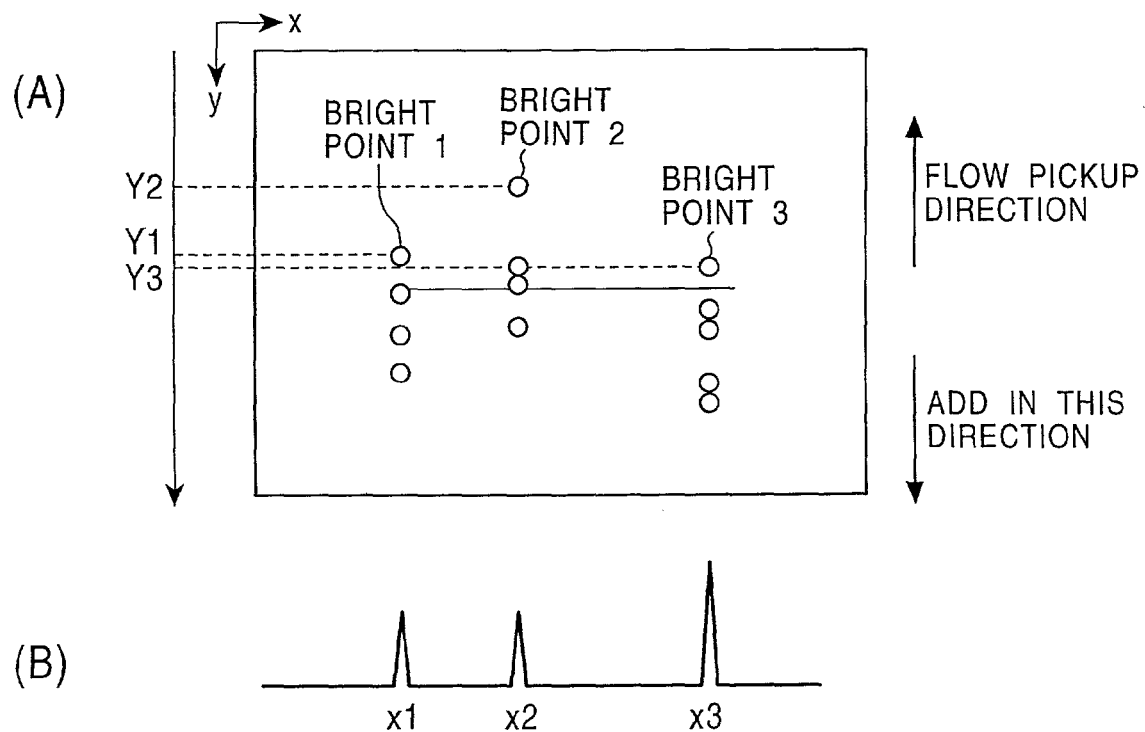
FIG. 17 is a view showing processing for detecting the positions of bright points.
Figure 18:
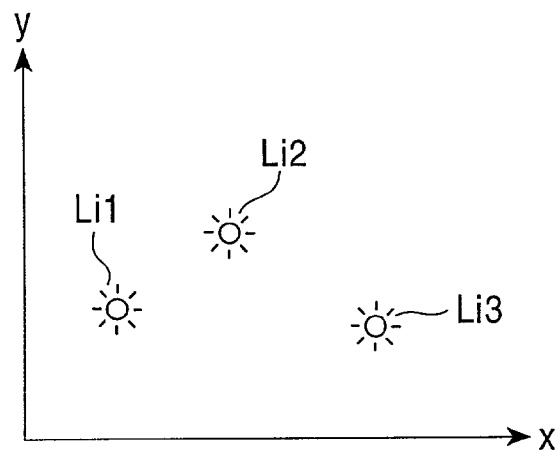
FIG. 18 is a view of the arrangement of the bright points.

FIG. 17(A) shows a case in which the image data of the blinking patterns of three bright points Li1, Li2, and Li3 disposed as shown in FIG. 18 are converted to a spatial patterns. To obtain the positions of the bright points Li1, Li2, and Li3, the image processing apparatus 4 adds pixel values "1" of the bright points disposed on scanning lines in the direction (in the y-axis direction in this case) in which capturing is performed in the flow pickup method to obtain peaks, as shown in FIG. 17(A), and regards the coordinates of the peaks in the x axis as the x coordinates of the bright points in the image. In this case, the x coordinates of the bright points Li1, Li2, and Li3 on the image display section are X1, X2, and X3, respectively.

The y coordinates of the bright points where they start emitting light are regarded as the y coordinates of the bright points on the image display section. In this case, since the flow pickup direction is negative, bright points 1, 2, and 3 are the positions where the bright points Li1, Li2, and Li3 start emitting. Therefore, the y coordinates of the bright points 1, 2, and 3, Y1, Y2, and Y3, are regarded as the y coordinates of the bright points Li1, Li2, and Li3, respectively.

In this way, the image processing apparatus 4 obtains the x and y coordinates, (X1, Y1), (X2, Y2), and (X3, Y3), of the bright points Li1, Li2, and Li3. The positions where the bright points Li1, Li2, and Li3 actually exist are detected correspondingly to these coordinates.

Figure 19:
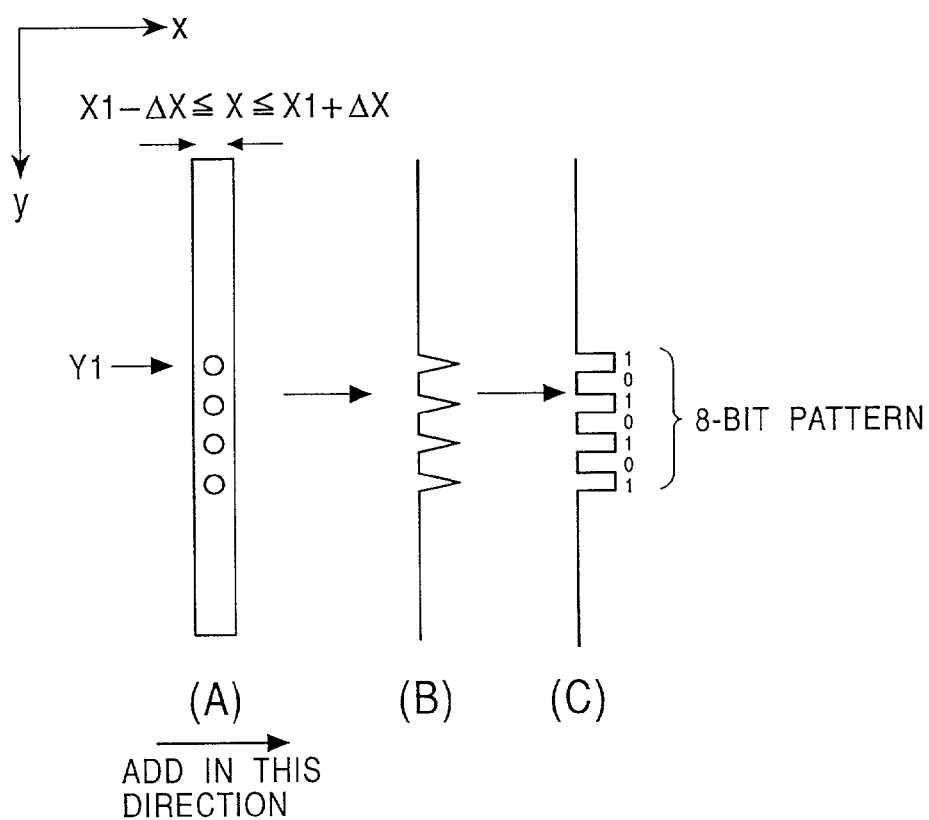
FIG. 19 is a view showing processing for detecting the state of a bright point.

A procedure for detecting the state of a bright point in the image processing apparatus 4 will be described next by referring to FIG. 19.

FIG. 19(A) shows the spatial pattern of the bright point Li1 shown in FIG. 17. To detect the state of the bright point Li1, the image processing apparatus 4 selects bright points disposed within a predetermined fluctuating range (X−ΔX≦x≦X+ΔX) of the x coordinate X1, adds in the x-axis direction, and obtains peaks as shown in FIG. 19(B). The image processing apparatus 4 then binarizes the obtained peaks by the use of a predetermined threshold to generate bit-pattern information shown in FIG. 19(C). With the use of the obtained bit pattern (10101010), the state of the bright point Li1 is detected. In this case, the bright point Li1 blinks with a blinking pattern from which eight-bit information is extracted.

Bright points disposed within a predetermined range in the x coordinate are selected to obtain a more precise bit pattern. The bit pattern is prevented from being changed due to, for example, an adjacent image having another spatial pattern.

The bit pattern obtained in this way is sent to the personal computer 5, and then, the same processing as that in the first embodiment is executed.

As described above, since the flow pickup method is used in the present embodiment, the position and the blinking pattern of a bright point can be simultaneously detected in one field.

Since the position and the blinking pattern of a bright point can be simultaneously detected, the processing time of the personal computer 5 is reduced. The time required for displaying position marks on an image is further made shorter than that in the first embodiment, and an easier-to-understand presentation system is provided for the audience.

All stages of a lens section (not shown) of the video camera 3 used in the present embodiment may be provided with optical filters. In this case, incident light other than that emitted from a bright point can be controlled.

Providing media for providing the user with a personal-computer program which executes the above-described processing include recording media, such as magnetic disks, CD-ROMs, and solid memories, and communication media, such as networks and satellites.

What is claimed is:

1. An image processing apparatus comprising:
   capturing means for capturing a first image partially including a second image projected by a projector, wherein said second image is an image of a screen area;
   extraction means for extracting the second image from the first image on the basis of image information captured by said capturing means;
   position determination means for determining a position of a bright point disposed on the second image, wherein said position is in a screen system; and
   blinking-pattern detection means for detecting a logical product of the blinking pattern of the bright point, wherein the logical product is of a first pixel value in a current field and at least one of the following: (i) a second pixel value in one of an immediately preceding field; or (ii) a third pixel value in an immediately subsequent field is obtained, and wherein the bright point is determined to exist only when said first pixel value and either said second pixel value or said third pixel value are on.

2. An image apparatus according to claim 1, wherein said position determination means compensates the position of the bright point on the second image to determine of the bright point on the first image.

3. An image apparatus according to claim 1, wherein the second image is taken by a flow pickup method, and said blinking-pattern detection means converts the image information to two-dimensional data and binarizes the data to detect the blinking pattern of the right point disposed on the first image.

4. An image processing method comprising:

a capturing step of capturing a first image partially including a second image projected by a projector, wherein said second image is an image of a screen area;

an extraction step for extracting the second image from the first image on the basis of image information captured in said capturing step;

a position determination step of determining a position of a bright point disposed on the second image, wherein said position is in a screen system; and a blinking-pattern detection step of detecting a logical product of the blinking pattern of the bright point, wherein the logical product is of a first pixel value in a current field and at least one of the following: (i) a second pixel value in one of an immediately preceding field; or (ii) a third pixel value in an immediately subsequent field is obtained, and wherein the bright point is determined to exist only when said first pixel value and either said second pixel value or said third pixel value are on.

5. A providing medium for providing a computer-readable program which makes an image processing apparatus execute processing, said processing comprising:

a capturing step of capturing a first image partially including a second image projected by a projector, wherein said second image is an image of a screen area;

an extraction step for extracting the second image from the first image on the basis of image information captured in said capturing step;

a position determination step of determining a position of a bright point disposed on the second image, wherein said position is in a screen system; and a blinking-pattern detection step of detecting a logical product of the blinking pattern of the bright point, wherein the logical product is of a first pixel value in a current field and at least one of the following: (i) a second pixel value in one of an immediately preceding field; or (ii) a third pixel value in an immediately subsequent field is obtained, and wherein the bright point is determined to exist only when said first pixel value and either said second pixel value or said third pixel value are on.

6. A presentation system comprising:

image display means for displaying a first image, wherein the first image is an image of a screen area;

pointing means for pointing to a position on the first image by a bright point;

pickup means for capturing a second image which includes the first image and the bright point pointed on the first image;

extraction means for extracting the first image from the second image on the basis of image information captured by said pickup means;

image processing means for determining the position of the bright point on the first image and for detecting the a logical product of blinking pattern of the bright point, wherein said position is in a screen system; and combination means for combining the first image correspondingly to the position of the bright point and the blinking pattern of the bright point detected by said image processing means, wherein the logical product is of a first pixel value in a current field and at least one of the following: (i) a second pixel value in one of an immediately preceding field; or (ii) a third pixel value in an immediately subsequent field is obtained, and wherein the bright point is determined to exist only when said first pixel value and either said second pixel value or said third pixel value are on.

* * * * *

UNITED STATES PATENT AND TRADEMARK OFFICE
CERTIFICATE OF CORRECTION

PATENT NO.       : 7,119,788 B2                                      Page 1 of 1
APPLICATION NO.  : 09/464161
DATED            : October 10, 2006
INVENTOR(S)      : Shinichiro Gomi et al.

It is certified that error appears in the above-identified patent and that said Letters Patent is hereby corrected as shown below:

In claim 2, column 16, line 60, "image apparatus" should read --image processing apparatus--.

In claim 2, column 16, line 62, "determine of" should read --determine the position of--.

In claim 3, column 16, line 64, "image apparatus" should read --image processing apparatus--.

In claim 3, column 17, line 1, "right" should read --bright--.

In claim 6, column 18, lines 21-22, "detecting the a" should read --detecting a--.

In claim 6, column 18, line 22, "of blinking" should read --of the blinking--.

Signed and Sealed this

Second Day of January, 2007

JON W. DUDAS
*Director of the United States Patent and Trademark Office*